United States Patent
Aquilina

(12) 
(10) Patent No.: US 6,220,639 B1
(45) Date of Patent: Apr. 24, 2001

(54) HANDLE ASSEMBLY FOR MANUAL TOOL

(75) Inventor: Paul Aquilina, Kitchener (CA)

(73) Assignee: Royal Alliance Inc., Ontario (CA)

( * ) Notice: Subject to any disclaimer, the term of this patent is extended or adjusted under 35 U.S.C. 154(b) by 0 days.

(21) Appl. No.: 09/313,869

(22) Filed: May 17, 1999

(51) Int. Cl.[7] .................................................. B25G 3/12
(52) U.S. Cl. ......................... 294/57; 403/359.6; 403/361
(58) Field of Search ............................... 294/49, 51, 54.5, 294/57; 403/359, 361, 375, 376, 379.2; 15/145; 16/110.1, 422

(56) References Cited

U.S. PATENT DOCUMENTS

| | | |
|---|---|---|
| D. 381,375 | 7/1997 | Spear et al. . |
| 1,263,131 * | 4/1918 | Seelye ..................................... 294/57 |
| 3,145,406 | 8/1964 | Lay . |
| 3,177,026 | 4/1965 | Cowan . |
| 3,549,189 | 12/1970 | Alosi . |
| 4,149,744 | 4/1979 | Bonnes . |
| 4,224,786 * | 9/1980 | Langlie et al. ...................... 403/361 |
| 4,280,727 | 7/1981 | Germain . |
| 4,406,559 | 9/1983 | Geertsema et al. . |
| 4,691,954 | 9/1987 | Shaud . |
| 4,697,949 | 10/1987 | Perez . |
| 4,720,206 | 1/1988 | Aquilina . |
| 4,892,434 * | 1/1990 | Miller .................................. 403/361 |
| 4,993,768 | 2/1991 | Ewen . |
| 5,010,615 | 4/1991 | Carter . |
| 5,172,447 * | 12/1992 | Tomm .................................... 16/422 |
| 5,288,161 | 2/1994 | Graves et al. . |
| 5,603,584 | 2/1997 | Schuele . |
| 5,682,641 | 11/1997 | Newman, Jr. et al. . |
| 5,816,633 * | 10/1998 | Odom .................................... 294/51 |
| 5,921,700 * | 7/1999 | Haver et al. .......................... 294/57 |
| 5,927,779 * | 7/1999 | Aquilina ................................ 294/57 |

* cited by examiner

Primary Examiner—Dean J. Kramer
(74) Attorney, Agent, or Firm—Barry R. Lipsitz

(57) ABSTRACT

A handle assembly for a manual tool such as a shovel includes an elongate, tubular handle member with a hollow connecting end portion and a screw hole formed in one side. The assembly includes an elongate, hollow connecting member with an exterior surface sized to fit snugly inside the hollow connecting end. A second screw hole is formed in the side of this primary section. The connecting member has an aperture formed in an outer end section. A screw is used to detachably connect the connecting member and the handle member. Ridges extending along opposite sides of the aperture engage flexible connecting members formed in an inner end of a socket of the tool member in order to connect the handle assembly thereto. There is also disclosed a metal connecting device which is elongate and substantially channel-shaped. Integral tabs mount this metal member in the elongate socket of the main tool section. A resilient catch on this connecting device projects inwardly between its two side portions and this catch engages a head of the screw in order to secure the handle assembly to the main tool section.

15 Claims, 5 Drawing Sheets

HANDLE ASSEMBLY FOR MANUAL TOOL

This invention relates to handle assemblies for tools, particularly manual tools and connecting devices for connecting handles to a tool head or main tool section.

BACKGROUND OF THE INVENTION

A variety of ways are known for connecting a tool handle to the tool head or the main section of the tool. Typically the handle of a manual tool comprises an elongate handle shaft that can be made of solid wood or a metal or plastic tube. Commonly an end section of this shaft is inserted into a socket formed in or on the tool head and then one or more connecting devices such as screws can be used to secure the handle shaft in the socket. It is important that the handle be connected securely and rigidly to the tool head both for proper functioning of the tool and for safety reasons.

U.S. Pat. No. 4,280,727 issued Jul. 28, 1981 to True Temper Corporation describes a one piece plastic injection molded snow shovel in which the blade, a synthetic plastic handle stem, and a D-top handle are molded in one operation. The shovel scoop is generally rectangular and made of plastic and has an integral, generally cylindrical hollow handle stem extending centrally outwardly from the rear edge of the scoop.

U.S. Pat. No. 4,149,744 issued Apr. 17, 1979 to The Union Fork & Hoe Company describes a snow shovel that includes a handle and a one-piece plastic scoop with a reinforced leading edge. The shovel has a rearwardly or upwardly opening socket integrally formed on the back surface of the scoop body that receives an end section of a handle which may be made of wood or plastic. Crush ribs are formed on the inside of the socket and these deform so as to form a close fit between the socket and the handle.

More recent U.S. Pat. No. 4,697,949 issued Oct. 6, 1987 to A. C. Perez describes a plug and socket coupling to detachably connect a handle to an implement. Formed on the implement is a cylindrical socket body that projects axially from one end of the implement. Integral latch ribs extend outwardly from the side of the socket body and there are also longitudinally extending anti-twisting ribs that extend from the base of the socket. Mounted on the handle is a plug which surrounds a cylindrical plug body having notches formed at its end. The notches receive anti-twisting ribs that are formed on the interior of the cylindrical socket. The plug is formed with spring strips that extend parallel to the axis of the cylindrical body. These spring strips have detents on their interior sides that receive the latching ribs of the socket.

It is an object of the present invention to provide a handle assembly for a tool that can be manufactured at a reasonable cost and that permits relatively easy attachment of the handle assembly to a tool member such as a shovel scoop.

It is a further object of the present invention to provide a simple connecting device for connecting an elongate handle to a main tool section, this connecting device being inexpensive to manufacture and comprising a substantially channel-shaped member that is formed with a resilient catch.

SUMMARY OF THE INVENTION

According to one aspect of the invention, a handle assembly for a tool comprises an elongate tubular handle member having a hollow connecting end portion, and an elongate connecting member rigidly mounted in the connecting end portion and having a primary section with an exterior surface that fits snugly inside the hollow connecting end portion. The connecting member has an aperture formed in an outer end section thereof located closest to a tool member when the latter is connected to the handle assembly. A ridge extends along the side of the aperture projects in a substantially transverse direction relative to the handle member, and is adapted to engage a flexible connecting member formed in an inner end of a socket of the tool member in order to connect the handle assembly to the tool member and prevent removal of the handle assembly from the tool member and prevent removal of the handle assembly from the tool member.

In the preferred embodiment, the aforementioned aperture has two, opposing straight, parallel sides and two ridges are formed by these opposite sides of the aperture for the purpose of engaging two flexible connecting members formed in the socket.

A connecting device for connecting an elongate handle to a main tool section of a manually operated tool is also described herein and includes an elongate, substantially channel-shaped member having two side portions. A tab mechanism is connected to the channel-shaped member and is provided for mounting the channel-shaped member in an elongate socket provided in the main tool section. A resilient catch is formed on the channel-shaped member and projects inwardly between the two side portions. This catch is adapted to pass over and then engage a protuberance on the handle in order to secure the handle to the main tool section. The protuberance projects from one side of the handle.

Preferably the tab mechanism includes two integral tabs bent outwardly to project from an outer side of the channel-shaped member. These tabs project away from the two side portions of the member.

According to a further aspect of the invention, a manually operated tool comprises an elongate tool handle and a main tool section with a connecting socket provided thereon. This connecting socket has an open end adapted to receive an end section of the tool handle and also has a longitudinally extending recess formed in a side thereof. A connecting device is fixedly mounted in the recess and extends therealong. This connecting device has a resilient catch provided thereon and projecting inwardly towards the center of the socket. The end section of the tool handle has a protuberance on one side thereof. The tool handle is connected to the main tool section by inserting its end section into the connecting socket and forcing the protuberance past the catch, which is able to move initially outwardly upon engagement of the protuberance and then to spring inwardly towards the center of the socket, thereby preventing removal of the tool handle from the socket.

In one preferred embodiment, the main tool section is a shovel scoop made of plastics material and the connecting device is made of metal.

Further features and advantages will become apparent from the following detailed description taken in conjunction with the accompanying drawings.

DETAILED DESCRIPTION OF PREFERRED EMBODIMENTS

Figure 1:
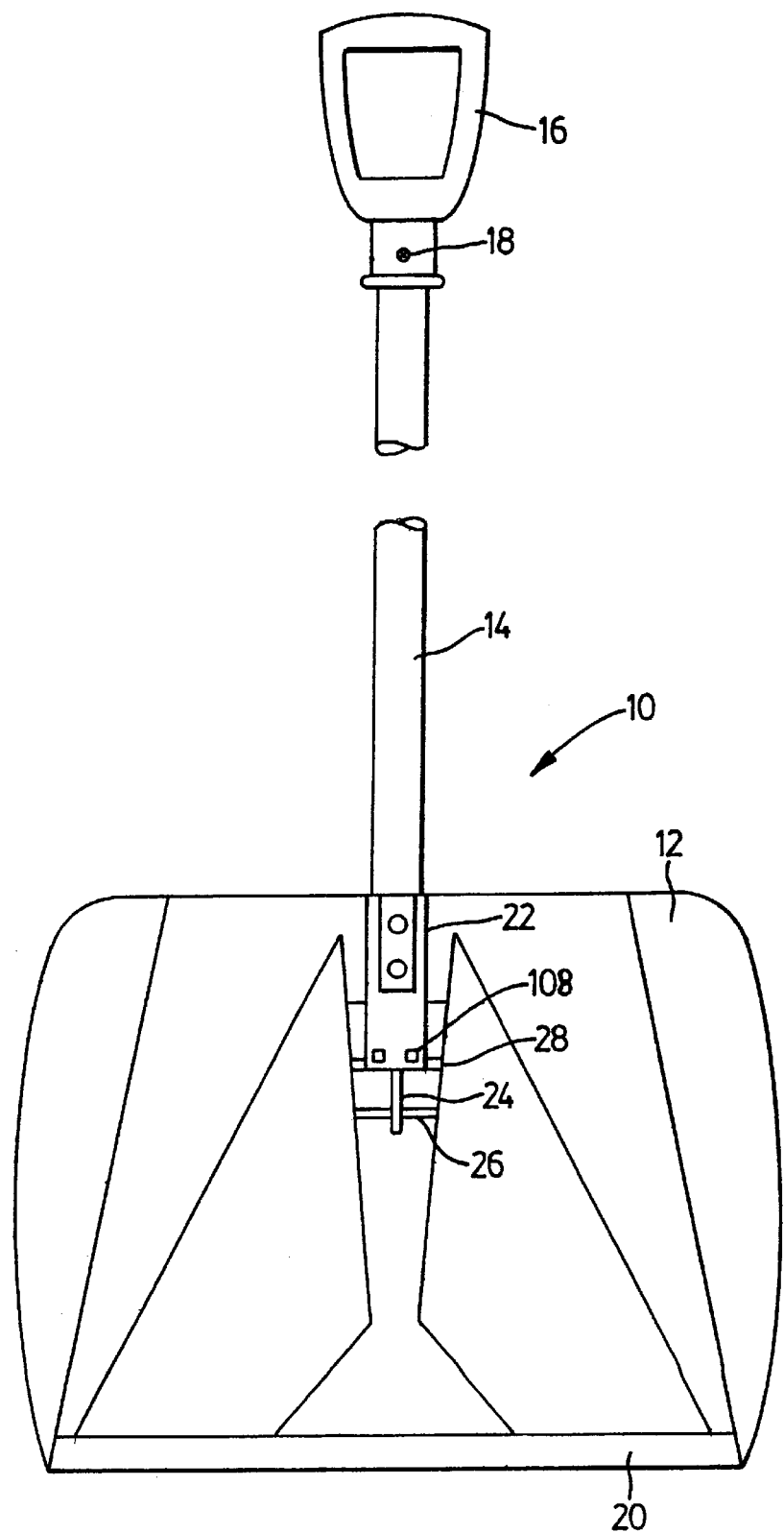
FIG. 1 is a rear view of a snow shovel made with a handle assembly constructed in accordance with the invention.
Figure 6:
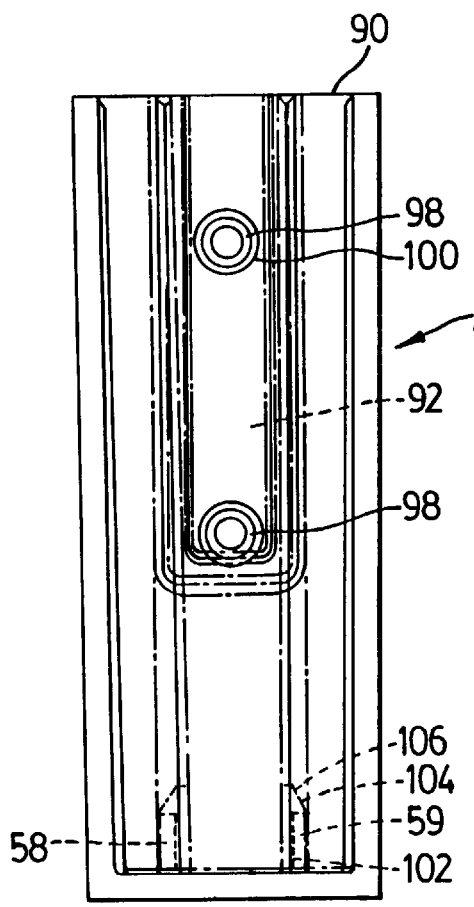
FIG. 6 is a rear side view of the socket portion only of the tool member to be connected to the handle assembly.
Figure 7:
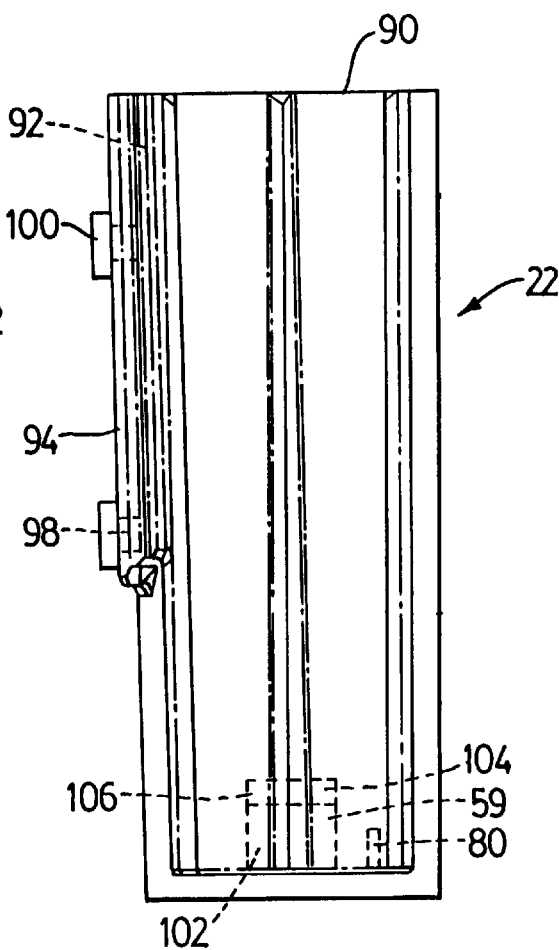
FIG. 7 is a right side view of the socket of FIG. 6.
Figure 8:
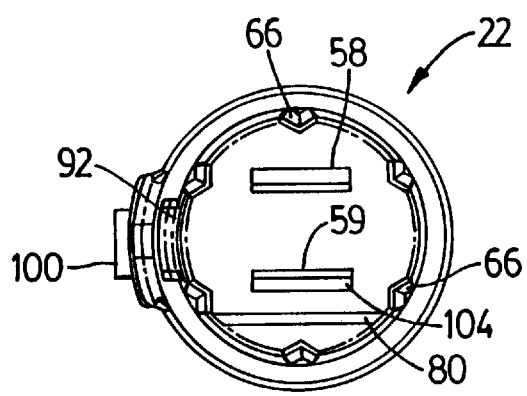
FIG. 8 is a top end view of the socket portion only.

A manually operated snow shovel 10 constructed in accordance with the invention is illustrated in FIG. 1. Although a snow shovel with a plastic shovel scoop 12 has been illustrated, it will be appreciated by those skilled in the art that the handle assembly of the invention can be used to construct a variety of tools that are equipped with an elongate handle, these tools including a variety of shovels, rakes, picks, hoes and a variety of manual cutting tools that employ an elongate handle. The shovel 10 shown in FIG. 1 has a long handle shaft 14 which can be made of solid wood or of tubular metal or plastic. In the case of a tubular metal shaft, it can, if desired, be coated with a ribbed protective plastic coating to prevent rust or other damage to the metal tubing. The illustrated handle includes a plastic or metal handgrip portion 16 which can be of standard construction. The handgrip portion 16 can be secured to the shaft by means of one or more threaded fasteners 18. The plastic shovel scoop 12 can be made with a reinforced cutting edge at 20, if desired. The illustrated shovel scoop 12 can be considered a main tool section or tool head for purposes of the present application. Integrally formed on or connected to the upper portion of the shovel scoop is an elongate connecting socket 22, the preferred details of which are illustrated in FIGS. 6 to 8. Integral plastic or metal braces 24, 26 and 28 can be used to rigidly mount the socket 22 to the upper portion of the shovel scoop. In the preferred embodiment illustrated, the socket is mounted on the rear side of the scoop so as not to interfere with the use of the shovel. An end section of the handle shaft 14 extends into the socket 22 and is securely mounted therein in order to prevent the end section from coming out of the socket and also to prevent relative rotation between the handle shaft and the shovel scoop.

Figure 2:
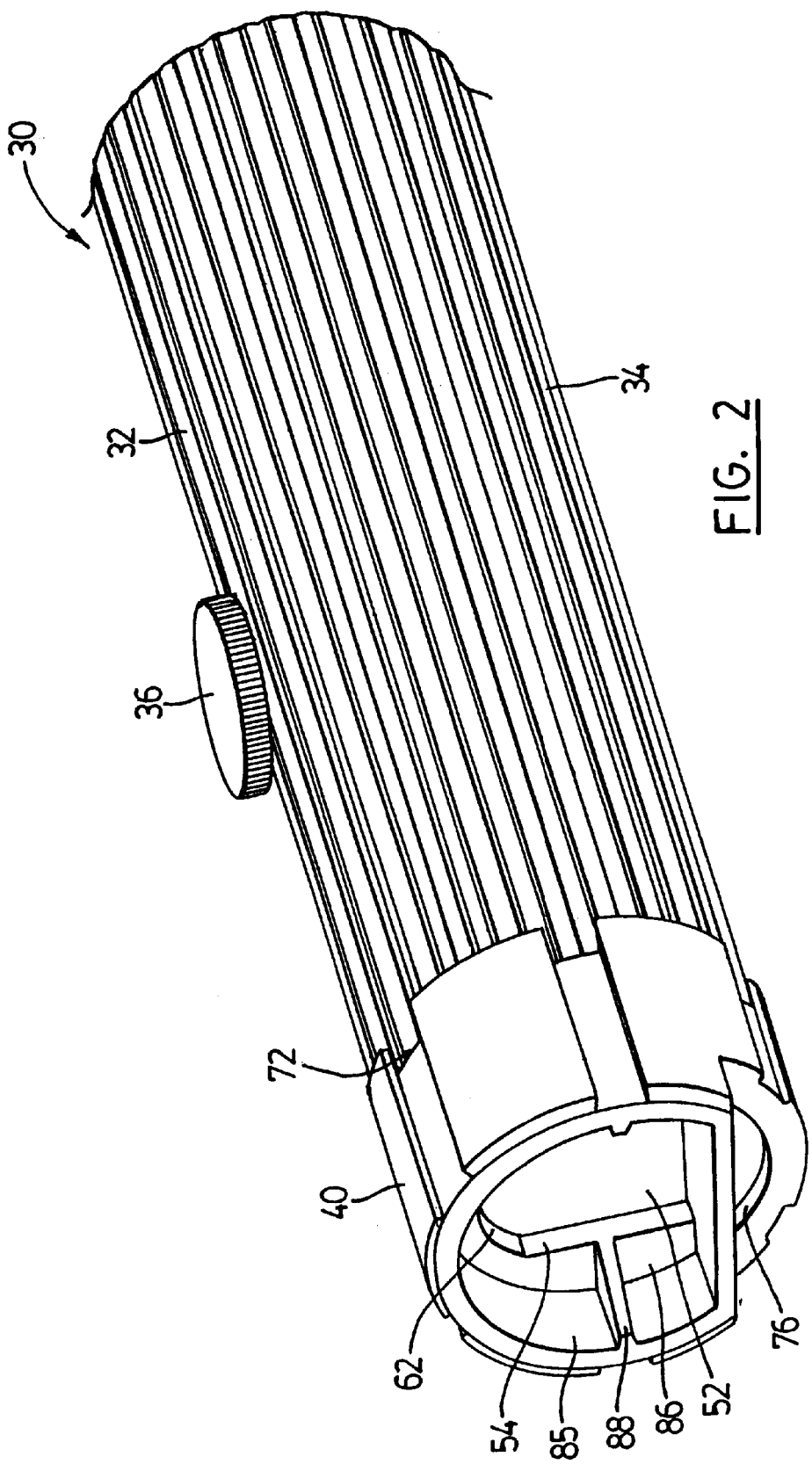
FIG. 2 is a perspective view of an end section of the handle assembly showing an aperture formed in the hollow end thereof.

The connecting end portion 32 of the preferred handle assembly of the invention is illustrated in FIG. 2. This preferred handle assembly includes an elongate, tubular handle member indicated by reference 30 in FIG. 2. This tubular handle member can be made of a suitably strong metal or a strong, rigid plastic material. It will be understood that the handle member can be similar in length to the handle shaft 14 illustrated in FIG. 1 and it can be straight or curved along its length, depending on the particular tool for which the handle member is intended. Also shown in FIG. 2 is a portion of a ribbed, plastic layer 34 that can extend over the entire length of the handle member, if desired. Located on one side of the end section is a relatively large protuberance which is preferably the head 36 of a suitable threaded connector such as a screw. This threaded connector extends through a first connector hole formed in a side of the end portion. By making the head 36 large, preferably with a knurled circumference, it is possible for the person assembling the tool to manually thread the screw into the tubular handle assembly.

Figure 3:
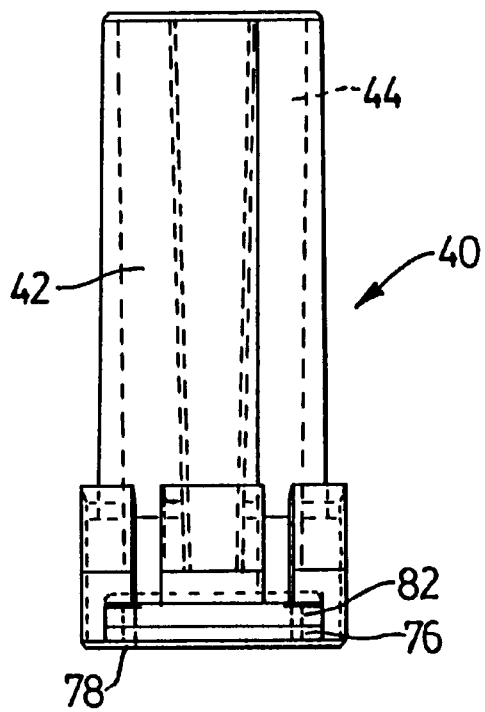
FIG. 3 is a first side view of a tubular connecting member used in the handle assembly of the invention.
Figure 4:
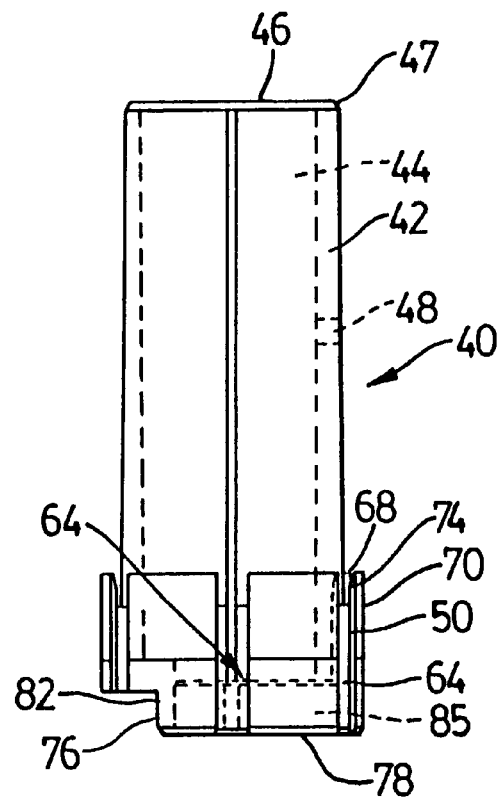
FIG. 4 is a right side view of the connecting member of FIG. 3.
Figure 5:
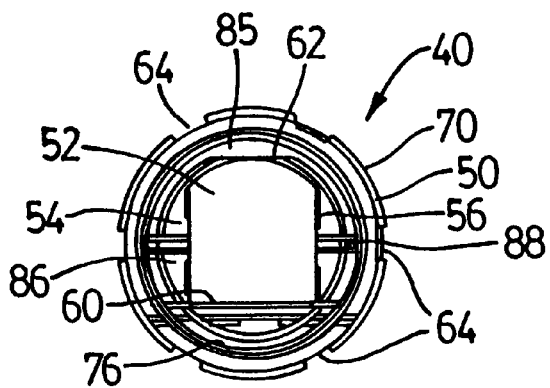
FIG. 5 is a bottom end view of the connecting member of FIG. 3.

Also, there can be seen in FIG. 2 an end section of an elongate connecting member or bong 40, the details of which are illustrated in FIGS. 3 to 5. The connecting member 40 has a primary section 42 with a cylindrical exterior surface sized to fit snugly inside the hollow, cylindrical connecting end portion 32 of the handle member. A passageway 44 extends the length of the primary section 42 and can be open, if desired, at end 46 of the member. The member can have a beveled edge 47 to assist in inserting the member into the handle member. A connector hole 48 is preferably formed in a side of the primary section for passage of the screw having the head 36. By means of this screw, the connecting member 40 is firmly and ridgidly held in the connecting end portion 32.

Formed in an outer end section 50 of the bong 40 is an aperture 52. At least one ridge and preferably two ridges 54, 56 extend along a side or sides of the aperture 52 and the or each ridge is adapted to engage a flexible connecting member 58, 59 illustrated in dashed lines in FIGS. 6 and 7 and described further hereinafter. As shown in FIGS. 2 and 5, each ridge 54, 56 projects in a substantially transverse direction relative to the handle member 30. The connecting members 58, 59 are formed in an inner end of the aforementioned socket 22 of the tool member in order to connect the handle assembly to the tool member. The preferred illustrated aperture has two opposing, straight parallel sides forming the two ridges 54, 56. The other sides of the illustrated aperture include a straight side 60 and a curved side 62.

It will be noted that the outer end section 50 of the bong has a larger diameter than the primary section 42 and furthermore it has longitudinally extending grooves 64 distributed evenly about its circumference. These openended grooves are adapted to receive longitudinal ribs 66 formed in the socket 22 (see FIG. 8). It will be appreciated that the engagement between the grooves 64 and the ribs 66 prevents relative rotation between the handle assembly and the tool member, for example the shovel scoop. As illustrated, the connecting member or bong 40 has six grooves 64 and the inside of the socket has six cooperating ribs 66, each of which can taper sharply to a center point along its length. Also shown in FIG. 4 is an undercut or slot 68 that is formed between each of the ridges 70 at an inner end thereof and the surface of the primary section 42. As illustrated in FIG. 2, the end of the tubular handle member located at 72 can be sized to fit tightly into the undercut 68. In order to assist with the insertion, the underside of each ridge 70 can be sloped at 74.

The outer end section of the connecting member 40 is preferably formed with an exterior recess 76 on one side thereof. This recess is open at an end thereof located at the end 78 of the connecting member and is provided to orient properly the handle assembly in the socket 22 of the tool member. Preferably formed in the inner end of the socket is a short locating wall 80 which can be integrally formed in the socket if it is made out of plastics. It will be appreciated that this wall 80 engages the side 82 of the recess 76. Because of this engagement, the handle assembly cannot rotate relative to the tool member when the end of the handle assembly has been fully inserted into the socket.

In the preferred connecting member or bong 40, the aperture 52 and the ridges formed on opposite sides thereof are spaced a short distance longitudinally from the end 78.

In particular, a circular recess 85 is formed in the end of the connecting member and the aperture is formed in a bottom wall 86 of the recess. This bottom wall can be supported by integral brackets 88 formed on opposite sides of the aperture.

The preferred, illustrated connecting member or bong 40 is a single integral molded member made of a suitably strong plastics material. In one version it has a total length of 2.95 inches and the primary section has a diameter of about 1 inch.

Further details of the preferred socket 22 will now be described with reference to FIGS. 6 to 8 of the drawings. The connecting socket has an open end 90 and is cylindrical as illustrated. However, other cross-sectional shapes for the socket are also possible, for example, square, rectangular or oval but it will be appreciated that the end section of the handle assembly to be inserted in the socket will normally have the same cross-section as the inside of the socket in order to provide for a snug and close engagement. The socket 22 has a longitudinally extending, elongate recess 92 formed on one side thereof. The preferred recess extends only part way along the length of the socket as shown in FIGS. 6 and 7, for example, a distance slightly greater than one half the internal length of the socket 22. In order to accommodate the recess, a longitudinal bulge projects outwardly from one side of the socket member, the height of this bulge being approximately equal to the depth of the recess 92.

Figure 9:
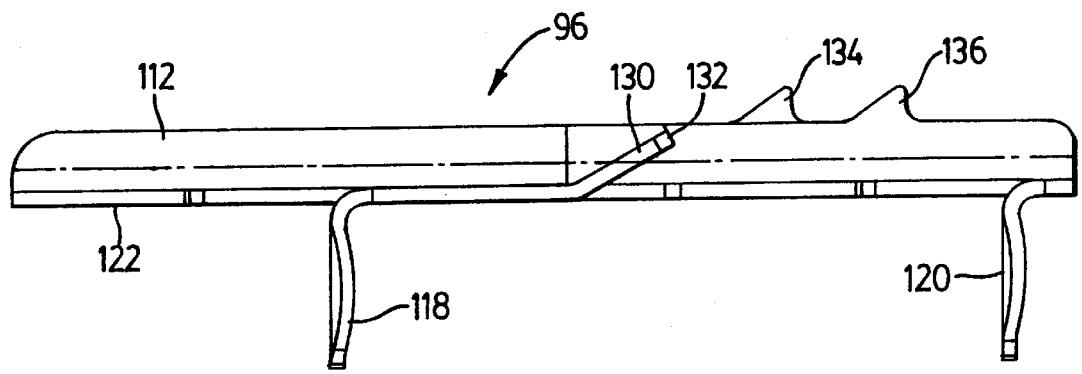
FIG. 9 is a longitudinal side view of a channel-shaped connecting device for connecting the handle assembly to the main tool section.
Figure 10:
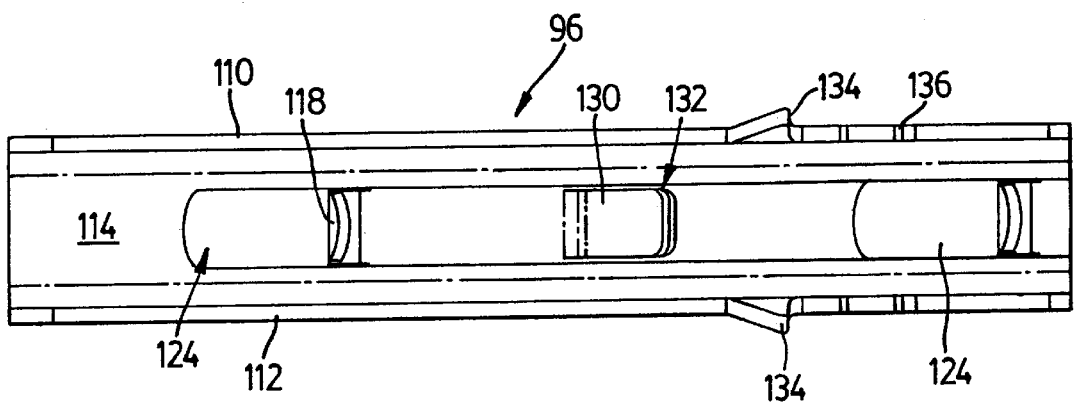
FIG. 10 is a plan view of the connecting device of FIG. 9.
Figure 11:
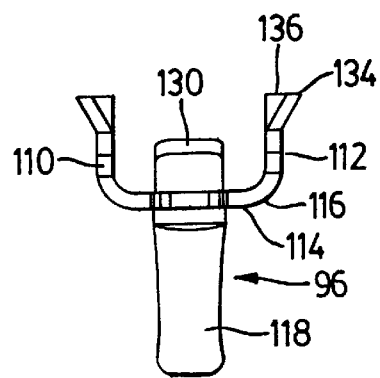
FIG. 11 is an end view of the connecting device of FIG. 9.

The function of the recess is to accommodate an elongate connecting device 96 shown in FIGS. 9 to 11 of the drawings. This connecting device preferably extends along the length of the recess and is rigidly mounted therein. Normally, the connecting device is made of a stronger and different material than the socket, for example, the connecting device 96 can be made of a metal such as steel or stainless steel. In order to mount the connecting device in the socket, two holes 98 are formed in the wall of the recess 92. If desired, a protective, circular rim 100 can be molded around each hole. If two screws are used to connect the tool handle to the socket (instead of using the connecting device 96) then the rims 100 will accommodate the heads of the screws therein and protect same. It should be appreciated that the socket construction 22 permits the user to mount the end of a shovel handle in the socket simply by using two connecting screws if the user wishes to use these screws to permanently connect the handle instead of using the bong 40 (in the case of a hollow handle assembly) and the connecting device 96.

Turning to the two connecting members 58, 59, each of these members is integrally formed at the inner end of the socket and includes a flat, flexible stem section 102 and an enlarged catch portion 104. The catch portion projects outwardly away from the center axis of the socket and preferably is formed with a sloping outer surface at 106 which enables the connecting member 58 or 59 to slide over the ridge at 54 or 56. The ridge will then engage the downwardly facing shoulder of the catch so that the handle assembly is held firmly in the socket. If desired, rectangular holes 108 can be formed near the bottom end of the socket to permit insertion of a small tool into the inner end of the socket in order to disengage the connecting members from the ridges 54, 56.

Turning now to the preferred construction of the connecting device 96 shown in FIGS. 9 to 11, this device comprises an elongate, substantially channel-shaped member made of a suitable, strong metal such as steel. Thus, the device 96 has two substantially parallel side portions 110, 112 and a bottom wall 114 extending between the two side portions. The joint between each side portion and the bottom wall can be rounded as indicated at 116.

Tab means for mounting the member 96 in the socket 22 are provided on the device 96. As illustrated, these tab means include two integral tabs 118 and 120 that are bent outwardly to project from an outer side 122 of the member 96. Thus, the tabs project away from the two side portions. The tabs can be punched from the bottom wall 114, leaving substantially rectangular holes 124. It will be understood that in order to mount the device 96 in the socket, the device 96 is inserted into the socket and then maneuvered to insert the projecting tabs 118, 120 through the two holes 98 formed in the recess. As the recess is sized to snugly accommodate the channel-shaped member, the member 96 can be placed fully into the recess and then the tabs are bent over so that they extend over the outside of the socket 22.

The connecting device 96 is also formed with a resilient catch 130 that projects inwardly between the two side portions 110, 112. This catch is adapted to pass over and then engage the screw head 36 of the handle assembly in order to secure the handle assembly to the main tool section. The catch 130 can be formed by punching it from the bottom wall 114 and preferably the catch is bent to extend at an acute angle to the bottom wall as shown. In one preferred embodiment, the catch extends at an angle of about 30 degrees to the bottom wall. It will be understood that the free end 132 of the catch is towards the bottom end of the socket.

The preferred connecting device 96 also is formed with pointed teeth 134, 136 which are integrally formed on the side portions. The two teeth on each side portion can be slightly staggered as shown in FIGS. 9 and 10 to increase the gripping effect. Also, as illustrated, the teeth can be inclined in the direction of the bottom end of the socket, thus making it easier to insert the handle assembly into the socket but more difficult to withdraw the handle assembly therefrom.

It will be understood that the channel shaped member 96 is sized to accommodate the enlarged head 36 of the screw, thus permitting the screw head to pass readily along the channel. When the screw head 36 engages the catch 130, forcing the handle assembly further into the socket causes the catch 130 to move initially outwardly upon engagement of the head or protuberance 36. Once the head is clearly past the catch 130, the catch is able to spring inwardly towards the center of the socket, thereby preventing removal of the tool handle from the socket. It should also be noted that the connecting device 96 can also be used to connect a solid handle shaft, such as a wooden shaft, to the shovel scoop. Although a solid wooden shaft may or may not have the screw head 36 provided thereon, the teeth 134, 136 will still engage the side of the wooden shaft helping to hold it in the socket and to prevent it from rotating in the socket 22.

It will be appreciated by those skilled in the construction of tools that various modifications and changes can be made to the described handle assembly, connecting device and socket without departing from the spirit and scope of this invention. Accordingly, all such modifications and changes as fall within the scope of the appended claims are intended to be included within the range of this invention.

What is claimed is:

1. A handle assembly for a tool comprising:
   an elongate tubular handle member having a hollow connecting end portion; and
   an elongate, connecting member rigidly mounted in said connecting end portion and having a primary section with an exterior surface that fits snugly inside said hollow connecting end portion, said connecting member having an aperture formed in an outer end section thereof located closest to a tool member when the latter is connected to the handle assembly, wherein a ridge extends along a side of said aperture, projects in a substantially transverse direction to said handle member, and is adapted to engage a flexible connecting member formed in an inner end of a socket of said tool member in order to connect said handle assembly to said tool member and prevent removal of said handle assembly from said tool member.

2. A handle assembly according to claim 1 wherein said aperture has two opposing, straight, parallel sides and two ridges are formed by these two opposite sides of said aperture for the purpose of engaging two flexible connecting members formed in said socket.

3. A handle assembly according to claim 2 wherein said outer end section of said connecting member has a larger diameter than said primary section and has longitudinally extending external grooves adapted to receive longitudinal ribs formed in said socket of the tool member.

4. A handle assembly according to claim 3 wherein said connecting member is a hollow integral molded member made of strong plastics material, said handle member and said connecting member are each formed with a connector hole in a side thereof, and a threaded connector detachably connects said connecting member to said handle member by extending through the two connector holes.

5. A handle assembly according to claim 2 wherein said aperture and said two ridges are spaced a short distance longitudinally from the outer end of the connecting member.

6. A manually operated shovel comprising a shovel blade section and a handle assembly according to claim 2, said blade section including said socket which is adapted to snugly receive an end section of said handle assembly and has said two flexible connecting members mounted at the inner end thereof.

7. A handle assembly according to claim 1 wherein said outer end section of said connecting member is formed with an exterior recess on one side thereof, said recess being open at an end thereof located at the outer end of the connecting member and being provided to orient properly the handle assembly in said socket of the tool member.

8. A manually operated tool comprising a main tool section and a handle assembly according to claim 1, said main tool section including said socket which is adapted to snugly receive an end section of said handle assembly and has said flexible connecting member mounted at the inner end thereof.

9. A manually operated tool comprising:

an elongate tool handle;

a main tool section with a connecting socket provided thereon, said connecting socket having an open end adapted to receive an end section of said tool handle and also having a longitudinally extending recess formed in a side thereof;

a connecting device fixedly mounted in said recess and extending therealong, said connecting device having a resilient catch provided thereon and projecting inwardly towards the center of said socket, wherein said end section of said tool handle has a protuberance on one side thereof and said tool handle is connected to said main tool section by inserting said end section into said connecting socket and forcing said protuberance past said catch, which is able to move initially outwardly upon engagement by said protuberance and then to spring inwardly towards the center of said socket, thereby preventing removal of the tool handle from said socket.

10. A manually operated tool according to claim 9 wherein said main tool section is a shovel scoop made of plastics material and said connecting device is made of metal.

11. A manually operated tool according to claim 9 wherein said tool handle comprises a hollow metal tube and an elongate connecting member mounted in an end section of said metal tube, said connecting member having an aperture formed in an outer end section thereof located closest to said main tool section and a ridge extending along a side of said aperture, and wherein a flexible connector is formed in an inner end of said connecting socket and engages said ridge in order to further connect said tool handle to said main tool section.

12. A manually operated tool according to claim 11 wherein two ridges extend along opposite sides of said aperture and another flexible connector is formed in said inner end of the connecting socket, the two flexible connectors each engaging a respective one of the ridges.

13. A manually operated tool according to claim 9 wherein said connecting device is elongate, is substantially channel shaped, and is formed with integral connecting tab means that extend through one or more holes formed in a side of said connecting socket in order to mount said connecting device in the connecting socket.

14. A manually operated tool according to claim 13 wherein said connecting device has two substantially parallel, longitudinal side portions which have teeth formed thereon in order to engage a side of said tool handle when the latter is inserted into said connecting socket.

15. A manually operated tool according to claim 14 wherein said main tool section is a shovel scoop made of plastics material and said tool handle includes a wooden handle shaft.

* * * * *